(No Model.)

E. E. C. THOMPSON.
PORTABLE TEA OR COFFEE POT.

No. 388,600. Patented Aug. 28, 1888.

WITNESSES:
George Binkenburg
C. Sedgwick

INVENTOR:
E. E. C. Thompson
BY Munn & Co.
ATTORNEYS.

UNITED STATES PATENT OFFICE.

EMMA E. C. THOMPSON, OF CHICAGO, ILLINOIS.

PORTABLE TEA AND COFFEE POT.

SPECIFICATION forming part of Letters Patent No. 388,600, dated August 28, 1888.

Application filed July 11, 1887. Serial No. 243,977. (No model.)

*To all whom it may concern:*

Be it known that I, EMMA E. C. THOMPSON, of Chicago, in the county of Cook and State of Illinois, have invented certain new and useful Improvements in Portable Tea and Coffee Pots, of which the following is a full, clear, and exact description.

The object of my invention is to provide a tea and coffee pot whereby greater portability and convenience in use is obtained than is ordinarily possible.

I will first describe in detail my invention and then point out the nature of the same in the claims.

Reference is to be had to the accompanying drawings, forming a part of this specification, in which similar letters of reference designate corresponding parts in all the figures.

Figure 1:
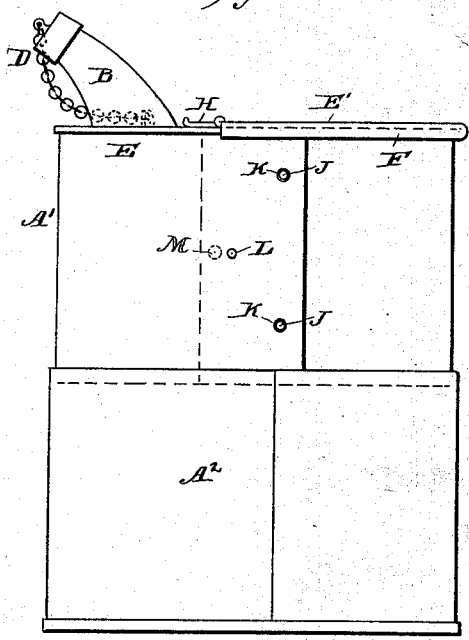
Figure 2:
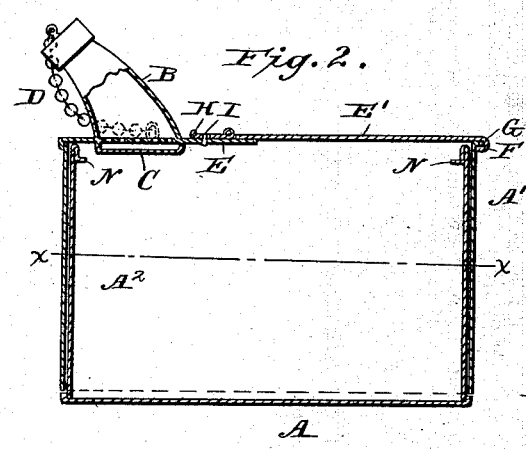
Figure 3:
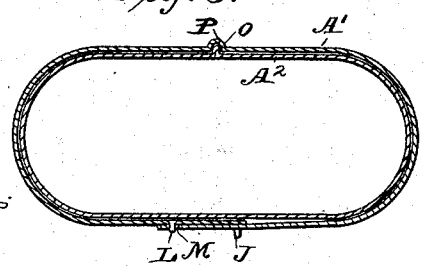

Figure 1 is a side view of my improved tea and coffee pot when expanded for use. Fig. 2 is a sectional elevation of the said pot when contracted. Fig. 3 is a sectional plan view of the same on the line $x\ x$, Fig. 2.

A designates a liquid-containing can, which is preferably of flattened elliptical form to better adapt it to the pocket.

The spout B is secured at its inner end to the can, and a bridge, C, is arranged in the interior of the can below the mouth of said spout. The spout B projects slightly above the top of the can, so that while firmly supported to the top of the can it is not sufficiently prominent to be in the way in carrying the pot in the pocket.

The bridge C is fixed horizontally near the top of the can, and in the top of the can, directly above the bridge, is a strainer.

A screw-cap and chain, D, may be provided for closing the mouth of the spout.

The top of the can is made in two sections, E E', the section E, which supports the spout B, being fixed, and the section E' movable to to form a lid, it being provided on its rear and side edges with a downwardly and inwardly turned flange, F, which is fitted to slide on an outwardly-projecting flange, G, around the opening in the top of the can.

A hinged clasp, H, on the front end of the slide-lid E' can be engaged with a stud, I, on the fixed section E to hold the lid tightly closed against leakage of the contained liquid.

The body of the can, which is preferably made of sheet metal, as tin, is formed of two horizontal sections, A' and A².

The lower section, A², is secured to the bottom of the can and the upper section to the top thereof. The upper section, A', is split, with overlapping ends, by which it may be adjusted to fit snugly inside the lower section, fastening-studs J on one end engaging apertures K in the other overlapping end, as shown in Fig. 1, or to fit outside of the lower section, a fastening-stud, L, on one end engaging an aperture, M, in the other overlapping end, as shown in Figs. 2 and 3. The lower section, A², is provided near its top with an internally-projecting shoulder, N, to support the upper section when the can is expanded, as in Fig. 1, and with a vertical exterior rib, O, which slides in a corresponding interior groove, P, in the upper section to guide the same in its telescopic contracting movement upon the lower section, as shown in Fig. 3.

Having thus described my invention, what I claim as new, and desire to secure by Letters Patent, is—

1. The expansible and contractible tea and coffee pot comprising an upper and a lower communicating section, one section being expansible and contractible horizontally to fit within or outside of the other section, substantially as and for the purpose set forth.

2. The expansible and contractible tea and coffee pot comprising a lower and an upper communicating section, one section sliding upon the other, while the upper section is formed into two parts horizontally expansible and contractible, substantially as and for the purpose set forth.

3. In an expansible and contractible tea and coffee pot, the combination of the lower and upper communicating sections, one section having a shoulder upon its inside near the upper end, while the other section is contractible horizontally, to enable it to rest at its lower edge upon said shoulder of the lower section, substantially as set forth.

4. In a tea and coffee pot, the upper section thereof provided with a bridge upon the inside at the top and with a spout secured integrally to said upper section and projecting above the top, substantially as and for the purpose set forth.

5. The tea and coffee pot comprising the lower and upper communicating sections, one section having a rib fitting in a groove in the other section and an inwardly-projecting shoulder near its upper edge, while the said other section is made in two parts horizontally contractible and expansible by projections or pins and apertures to permit the said other section to be supported upon the said shoulder of the first-named section and the telescoping of the first-named section within the latter section, substantially as set forth.

EMMA E. C. THOMPSON.

Witnesses:
MARY E. THOMPSON,
SOPHIE J. A. THOMPSON.